United States Patent Office

3,829,412
Patented Aug. 13, 1974

3,829,412
CHEMICALLY MODIFIED POLYSACCHARIDES
AND PROCESS OF PREPARING SAME
Frederick L. G. Kunz, Manitowoc, Wis., assignor to
Frederick Lunz and Company, Limited, Manitowoc,
Wis.
No Drawing. Filed May 15, 1970, Ser. No. 37,919
Claims priority, application Germany, May 16, 1969,
P 19 24 900.4
Int. Cl. C07c *47/18;* C07g *3/00*
U.S. Cl. 260—209 R                                    11 Claims

ABSTRACT OF THE DISCLOSURE

Polysaccharides chemically reacted in solution with a bifunctional etherifying compounds, such as epichlorohydrin and glycerol dihalohydrin, to effect cross-linking and providing a modified polysaccharide which forms aqueous solutions having a predetermined increased viscosity comparable to solutions of commercially available gums, and said modified polysaccharides preferably being stabilized against further cross-linking by reacting with a hydroxy compound having a primary hydroxyl group, such as pentaerythritol, ethylene glycol and sorbitol; and the process of preparing and stabilizing modified polysaccharides in an aqueous solution.

---

The present invention relates generally to modified polysaccharide compounds which form aqueous solutions having a viscosity comparable to those produced by commercially available gums and which are capable of retaining their solution viscosity without increasing significantly and avoid forming insoluble products on dry storage; and to the preparation of modified polysaccharide compounds having the foregoing properties.

Heretofore, solutions of polysaccharides, such as hemicellulose or pentosans derived from vegetable fiber and certain hexosans, were considered inferior to solutions of commercially available gums. The principal reason for this was the low viscosity of their aqueous solution and the lack of some other desirable rheological properties. Thus, commercial production of these hemi celluloses has never been seriously attempted, and no recent efforts have been made to modify these products in order to make them competitive with or superior to commercially available gums.

Difficulties also arise where only a viscosity increase is desired when preparing aqueous solutions of polysaccharides having increased viscosity. Polysaccharides cross-linked with epichlorohydrin usually are unstable, i.e., the cross-linking reaction continues even in the dry state causing undesirable changes in the product. These cross-linked products exhibit an increase in the solution viscosity thereof on standing and finally becomes partially or completely insoluble. These changes usually occur within a few days of preparation and often during drying. Also, for a similar reason, it is either impossible or extremely difficult to control the viscosity of these modified products and to obtain reproducible results, and frequently the material begins to show signs of insolubility during the process of preparation. These are the principal reasons that all previous attempts of changing low viscosity polysaccharides into medium or high viscosity products and that reactions with epichlorohydrin for the purpose of substantially increasing viscosity have not attained commercial interest.

It is therefore an object of the present invention to provide stable modified polysaccharide compounds which have a higher solution viscosity than the original polysaccharides.

Another object of the present invention is to change other rheological properties of polysaccharides to obtain more desirable characteristics.

A further object of this invention is to provide modified polysaccharide compounds in a stable form which exhibit no significant viscosity change or partial or complete insolubilization.

A still further object of the invention is to control the viscosity increase of the modified polysaccharide compounds so as to allow reproducibility of results.

It is also an object of the present invention to provide novel polysaccharides cross-linked with epichlorohydrin and containing glycidyl ether groups.

Other objects of the present invention will become apparent during the description which follows.

In general, the present invention comprises modifying polysaccharides, such as hemicelluloses or pentosans and hexosans, by chemical cross-linking reaction with a bifunctional etherifying reagent or compound, such as epichlorohydrin, alkyl substituted epichlorohydrin or with other bi-functional etherifying reagents, such as glycerol dihalohydrin, and preferably stabilizing the resulting product by further reacting with a hydroxy compound having a primary hydroxyl group to form glycidyl ether groups on said cross-linked polysaccharide.

The polysaccharides, including pentosans and hexosans, which can be used in the present invention are preferably those obtainable from vegetable matter, such as barley husks, barley malt husks, oat hulls, corn hulls, corn cobs, wheat bran, and similar materials from other vegetable sources. A number of publications on the isolation of hemicelluloses from such sources have appeared in the literature, including U.S. Pats. 2,709,699 and 2,801,955, and any of the procedures described in the literature can be used for the preparation of the starting polysaccharide material to be modified by the process of the present invention.

In carrying out the present invention an aqueous solution of a polysaccharide is prepared having a concentration of between about 3% and 15% by weight, and preferably a concentration of between about 7% and 10% by weight, sodium hydroxide or other alkaline reagent is added to provide an alkaline reaction solution, and the solution heated at a temperature between about 40° C.–100° C., and preferably to a temperature of about 60° C.–70° C., and mechanically stirred or mixed. The concentration of the polysaccharide in the solution can be above 15% by weight, but the resulting paste is difficult to handle. Solutions having a polysaccharide concentration below 3% weight are undesirable, because a relatively large amount of cross-linking reagent is necessary for the subsequent reaction. Epichlorohydrin or other bi-functional etherifying compound is then added to the aqueous reaction solution slowly and in small portions until the desired viscosity increase is substantially reached. The reaction solution in each instance contains sufficient alkaline reagent to maintain the said aqueous reaction solution alkaline while the bi-functional etherifying reagent reacts with the polysaccharide molecules. The molar concentration of sodium hydroxide or other alkalizing reagent used to form the alkaline aqueous reaction solution should be at least as high as, and preferably higher than, the molar concentration of the added epichlorohydrin or other bi-functional etherifying reagent having an epoxy and a chloro etherifying group. When the bi-functional etherifying reagent is a dichloro compound, at least two moles of alkalizing agent is used for each mole of the etherifying reagent. Thus, the alkaline reagent is used in direct molar proportion to the number of active chlorines in each mole of the etherifying reagent. Instead of sodium hydroxide, any other base or basic salt, such as potassium hydroxide, lithium hydroxide, calcium hydroxide, alkali carbonate, and the like, may be used equally well as the alkaline reagent.

While various bi-functional etherifying compounds for effecting cross-linking can be used to provide epoxy groups which form ether linkages with the polysaccharide molecule, the preferred cross-linking reagents are epichlorohydrin and the alkyl substituted epichlorohydrins 1,2-epoxy-3-chloro alkanes represented by the formula

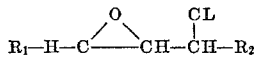

wherein $R_1$ and $R_2$ are alkyl, preferably having from 1 to 5 carbon atoms. The amount of epichlorohydrin or other bi-functional etherifying compound varies with the degree of thickening to be produced, and for a given polysaccharide solution the viscosity increases with increasing amount of epichlorohydrin. The amount of epichlorohydrin or other bi-functional etherifying reagent can, for example, vary between 1 and 20% of the weight of the polysaccharide in order to achieve significant viscosity increases. The amount of cross-linking reagent required depends also on the concentration of the polysaccharide, and, the lower the concentration of the polysaccharide the higher usually is the amount of epichlorohydrin required to obtain a significant viscosity increase. The time of reaction should be at least about one hour and, preferably, longer. To accomplish the viscosity increase in considerably less time by, for example, increasing the amount of epichlorohydrin or adding the epichlorohydrin at a relatively fast rate is undesirable since the reaction may go too far and the product become partially insoluble. This usually is indicated by a gelatinous consistency of the reaction mixture. Ideally, just enough epichlorohydrin should be added so that the desired viscosity change is obtained within 1–3 hours and further stirring and heating changes the viscosity only insignificantly. However, even in this case, the product usually is unstable, if it is isolated and stored in the dry state.

In addition to successfully effecting substantial increases in the viscosity of aqueous solutions of polysaccharides the present invention provides a method of stopping the cross-linking reaction at any desirable point and, furthermore, preventing continued cross-linking of the polysaccharides in the dry state. As soon as the desired viscosity has been substantially attained by reacting the polysaccharide with epichlorohydrin or other bi-functional etherifying compound as generally described, a hydroxy compound which contains one or more primary hydroxyl groups, such as the water soluble polyhydric compounds mono- and oligo-saccharides, sugar alcohols, polysaccharide hydrolysates, corn syrup, dextrose, mannitol, sorbitol, pentaerythritol, ethylene glycol and glycerol, and also including such monohydric compounds as aliphatic alcohols, amino alcohols and organic hydroxy acids, and the like which are water soluble, is added to the alkaline aqueous reaction solution. Other desirable properties of the hydroxy compound are that the compound be of a relatively low molecular weight and non-volatile up to about 90° C.–100° C. The hydroxy compound added to the solution reacts with the excess unreacted bi-functional etherifying reagent remaining in the reaction solution and with any unreacted etherifying groups of the bi-functional reagent which has not completely reacted with the polysaccharide until essentially all the bi-functional etherifying reagent and/or all of the partially reacted bi-functional etherifying reagent are consumed, thereby effectively preventing any appreciable further cross-linking between the bi-functional etherifying reagent and a hydroxy group of a polysaccharide molecule. When the hydroxy group of the added hydroxy compound reacts with an epoxy group contained in an epoxy cross-linked polysaccharide, the principal product formed is compound B shown, although a minor amount of compound C can also be formed in accordance with the following equations. Both compounds B and C have glycidyl ether groups which do not cross-link with other polysaccharide molecules.

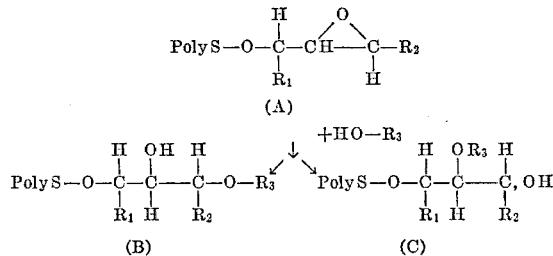

wherein PolyS represents a plurality of the polysaccharide molecules cross-linked with molecules of bi-functional etherifying compound, $R_1$ and $R_2$ are hydrogen or alkyl groups, and $R_3$ is a residue of a hydroxy compound after removal of the primary hydroxyl group thereof.

The amount of the added hydroxy compound, such an alcohol, which is necessary to stop the cross-linking reaction generally is between 5 and 30% of the weight of the polysaccharide compound, depending somewhat on the amount of bi-functional or cross-linking compound added, the prior reaction time, and the type of hydroxy or alcoholic compound used. As pointed out above, the ideal amount of bi-functional etherifying compound, such as epichlorohydrin, is that which, after obtaining the desired viscosity, does not significantly increase the viscosity any further on continued heating and stirring. In this case, the amount of hydroxy or alcoholic compound required is the lowest. Although larger quantities may be used, it is desirable to use as little as possible, because of economical considerations and because larger quantities are of no additional benefit.

After addition of the hydroxy compound, stirring and heating is continued for one or more hours to consume essentially all of the residual epoxy groups formed by the bi-functional etherifying compound. During this time, the temperature preferably is raised to about 90° C.–100° C. to accelerate the reaction rate. The mixture then is neutralized by the addition of acid, such as hydrochloric, sulfuric, phosphoric, acetic acids, and the like, and the thick syrup poured slowly and with vigorous agitation into 1–3 volumes of a water miscible organic solvent, such as methanol, ethanol, isopropanol, acetone, and the like. The precipitate is removed, washed with aqueous and/or anhydrous alcohol or acetone, and dried. Of course, it is also possible to spray dry the product directly to obtain a technical grade product and, subsequently, extract it with aqueous solvent, such as methanol, ethanol, isopropanol, etc., containing about 10–50% by weight water to obtain a refined material.

To be absolutely assured of a long shelf life of the product and as an additional safety factor, the product can have incorporated therewith a small amount of a non-volatile hydroxy compound, such as used for stopping cross-linkage. This can be accomplished either by adding the hydroxy compound to the last wash with aqueous or non-aqueous solvent or by spraying a solution of it directly on the product and evaporating the solvent. Although the amount of the alcohol to be incorporated is not critical, it should not be much below 1% by weight of the modified polysaccharide in order to be effective. Also, a homogeneous distribution is very important.

While, in the foregoing description, the polysaccharides used for modification by our process are relatively pure, i.e., they first are isolated as a dry powder and re-dissolved in water, the reaction can be carried out with equal success directly with the alkaline extract of vegetable fiber procedures. For extraction of barley hulls, barley malt hulls, oat hulls, corn hulls etc. with alkali hydroxides, alkali earth hydroxides, and basic salts are described in the literature, and any of the extracts obtainable by these published procedures is suitable. For example, vegetable fiber, such as mentioned above, may be extracted with dilute alkali hydroxide, the solids removed from the extract by centrifugation, and the extract concentrated under atmospheric pressure or in vacuo to the desired concentration of hemicellulose, which should not be considerably less than 5% by weight. This alkaline solution is used directly for the cross-linking reaction. The cross-linking reaction with epichlorohydrin or other bi-functional etherifying compound, and the termination of this reaction by the addition of a low molecular weight hydroxy compound are carried out under conditions as described above. However, a slightly larger amount of epichlorohydrin is required to accomplish a significant viscosity increase, probably because of the presence of some low molecular weight carbohydrates in the extract. Where there is a prior isolation of the polysaccharide, these low molecular weight compounds are removed. The addition of alkali prior to the cross-linking reaction is unnecessary where there has been no prior isolation of the polysaccharide, since the extract usually contains excess alkali.

The final products obtainable directly from the extract and those from relatively pure polysaccharides essentially exhibit the same properties. Their aqueous solutions are clear and highly pseudoplastic, i.e., they have a relatively low viscosity at a high rate of shear and a high viscosity at a low rate of shear. They exhibit an unusually high stability to high and low pH values, to enzymes, to heat, and to certain chemicals. They are unique in their compatability with salts and other compounds, being compatible with extremely high concentrations or saturated solutions of inorganic salts and even compounds, such as calcium, strontium, and barium hydroxides, aluminates, zincates, stannates, etc. Any desirable viscosity grade can be obtained by the process, and 1% aqueous solutions of the various grades of the herein disclosed modified polysaccharides can range between about 10 and 1500 cps. (Brookfield Viscometer, Model LVT, 60 r.p.m., 25° C.).

A slightly yellowish color which usually is more pronounced when the extract is used directly may be partially or completely removed by bleaching. This is conveniently done by adding the required amount of an oxidant, such as chlorine or hypochlorite, to the alkaline solution of the polysacchraide prior to the cross-linking reaction. The solution then is held at room or slightly elevated temperature until the desired degree of lightness is obtained. Then, the excess of oxidant is reduced with a reducing agent, such as sulfur dioxide or sulfite, and the cross-linking reaction intiated.

Illustrations of how to carry out the present invention will now be given by a number of specific examples without, however, limiting the invention to the particular proportions or materials used:

EXAMPLE I

Hemicellulose (20 g.) from barley malt husks as obtained in the brewing process was dissolved in 200 ml. of water, and 4 ml. of a 50% by weight aqueous solution of sodium hydroxide was added. The mixture was stirred mechanically, the temperature raised to and maintained at about 65° C., and 2.5 ml. of epichlorohydrin added in small portions over a period of about 1.5 hours. The solution was very viscous, and the viscosity increased moderately on further heating and stirring for another 30 minutes. Then, 4 g. of dextrose was added, the temperature increased to about 90° C., and heating and stirring continued for 2 more hours. The thick syrup was neutralized by the addition of acid and poured slowly and with vigorous agitation into 2 volumes of methanol, the precipitate removed by centrifugation, washed with 80% aqueous methanol, dehydrated with acetone, and dried; yield, about 20 g.; viscosity of a 1% aqueous solution, 190 cps.

In a similar experiment, the final product, after dehydration with methanol, was incorporated with 4 g. of corn syrup diluted with about 5 ml. of water, dried, and milled. The product was similar, but an aqueous solution had a slightly lower viscosity.

EXAMPLE II

Hemicellulose (20 g.) from barley malt husks as obtained in the brewing process was dissolved in about 200 ml. of water, and 4 ml. of a 50% aqueous solution of sodium hydroxide was added. Then, about 20 ml. of a 6% by weight aqueous solution of sodium hypochlorite was added and the mixture kept until almost decolorized. Excess hypochlorite was reduced by the addition of a stoichiometric amount of sodium bisulfite. The mixture then was stirred, the temperature kept at 60–70° C., and 1.5 ml. of epichlorohydrin was added in one 1.0 ml. and five 0.1 ml. portions over a period of 1–1.5 hours. After a total mixing time of about 2 hours, 3 g. of pentaerythritol was added, the temperature raised to 95° C., and heating and stirring continued for 2–3 hours. Then, the mixture was neutralized, the product precipitated by adding the highly viscous solution with vigorous stirring to about 2 volumes of methanol, washed with 90% aqueous methanol, and centrifuged, and the wet cake incorporated with 1 g. of pentaerythritol and dried. The product formed a clear and essentially colorless solution, and the viscosity of a 1% by weight aqueous solution was about 60 cps.

EXAMPLE III

Barley malt husks (65 g.) were mixed vigorously with 900 ml. of water containing 10 g. of sodium hydroxide while the temperature was maintained at 90–100° C. by using a steam bath. The mixture then was centrifuged, the residue washed with water, and the combined extracts concentrated to a hemicellulose concentration of about 8%. This extract was used directly for the subsequent bleaching and reaction with epichlorohydrin. The reaction conditions were similar to those described under Example II. However, instead of 1.5 ml., 2.3 ml. of epichlorohydrin was used and added in one 1.0 ml., two 0.5 ml., and three 0.1 ml. portions. Ethylene glycol was used instead of pentaerythritol, and its weight was reduced by about 20%. The final product weighed about 25 g., and a 1% by weight aqueous solution had a viscosity of about 240 cps.

EXAMPLE IV

Hemicellulose (30 g.) from barley husks was dissolved in 300 ml. of water, and 3 ml. of a 50% aqueous solution of sodium hydroxide was added. The mixture was mechanically stirred, heated at 65–70° C., and 1.5 ml. of epichlorohydrin was added in one 1.0 ml., one 0.3 ml., and two 0.1 ml. portions over a period of about 1 hour. This resulted in a significant viscosity increase. On further heating and stirring for 30 minutes, only a moderate viscosity increase occurred. Then, 4 g. of ethylene glycol was added, the temperature raised to 90–95° C., and heating and stirring continued for 2 hours. The extremely viscous solution was neutralized by the addition of hydrochloric acid, poured slowly and with vigorous agitation into 600 ml. of ethanol, and the precipitate removed and washed with 90% aqueous ethanol. The wet product, after centrifugation, was incorporated with about 1.5 g. of ethylene glycol, dried, and milled; yield, about 33 g.; viscosity of a 1% by wt. aqueous solution, above 200 cps.

In a similar experiment, the amount of epichlorohydrin was increased by 0.15 ml. All other conditions were the same. The resulting product has a viscosity of about 300 cps.

EXAMPLE V

Hemicellulose (30 g.) from barley husks was dissolved in 300 ml. of water, and 3 ml. of a 50% aqueous sodium hydroxide solution was added. Then, about 20 ml. of a 6% aqueous solution of sodium hypochlorite was added and the mixture kept at room temperature until almost decolorized. Excess hypochlorite was reduced by the addition of a stoichiometric amount of sodium sulfite. From thereon, the experiment was continued as described under Example IV using methanol for precipitation and glycerol instead of ethylene glycol. The product formed a colorless solution in water, and the viscosity of a 1% by wt. aqueous solution was about 200 cps.

EXAMPLE VI

Example V was repeated, but, instead of 1.5 ml., a total of 1.3 mol. of epichlorohydrin was added in one 1.0 ml. and three 0.1 ml. portions over a period of about 3 hours. A 1% by wt. aqueous solution of the final product had a viscosity of 70 cps.

EXAMPLE VII

Hemicellulose (25 g.) from barley husks was dissolved in 350 ml. of water, 4 ml. of a 50% aqueous sodium hydroxide solution added, and the mixture decolorized by the introduction of a small amount of chlorine. Excess of oxidant was reduced by introducing a stoichiometric quantity of sulfur dioxide. The temperature was raised to 65–70° C., and 2.4 ml. of epichlorohydrin was added in one 0.5 ml., seven 0.2 ml., and five 0.1 m. portions over a period of 2–3 hours. Then 5 g. of sorbitol was added, the temperature raised to 97° C., and heating and stirring continued for 2 hours. It was neutralized with acetic acid and the product precipitated by adding the thick syrup with vigorous agitation to 2 volumes of isopropanol. The solids were removed by centrifugation, resuspended and ground in isopropanol, and centrifuged again. The wet product was incorporated with 2 g. of corn syrup and dried; yield, about 28 g.; viscosity of a 1% by wt. aqueous solution, above 400 cps.

EXAMPLE VIII

Example VII was repeated, however, a total of only 1.1 ml. of epichlorohydrin was added during a period of about 2 hours. Otherwise, conditions were the same. A 1% by wt. aqueous solution of the final product had a viscosity of 10–15 cps.

EXAMPLE IX

Example V was repeated, however, 50 g. of hemicellulose derived from corn hulls was used as a solution in 500 ml. of water containing 5 ml. of a 50% aqueous sodium hydroxide solution. Bleaching was carried out with 30 ml. of a 6% aqueous sodium hypochlorite solution. The amount of ethylene glycol for interrupting the cross-linking reaction was increased to 7 g. and that for incorporation to 2 g. The final product formed a clear and colorless solution; yield, about 55 g.; viscosity of a 1% by wt. aqueous solution, about 360 cps.

Reduction of the amount of epichlorohydrin to 1.3 ml. reduced the viscosity of the final product to about 100 cps. while an increase to 1.65 ml. of epichlorohydrin resulted in a product with a 1% by wt. aqueous solution exhibiting a viscosity of about 600 cps.

EXAMPLE X

Corn hulls (200 g.) were extracted by stirring at 97° C. in 2000 ml. of water containing 30 g. of sodium hydroxide for 1.5 hours. The alkaline extract obtained after centrifugation was concentrated to a hemicellulose concentration of about 9% and then used directly for the reaction with epichlorohydrin. The further procedure was identical with that described under Example IV. The total amount of epichlorohydrin used was 2.9 ml. The yield of product was about 63 g. and the viscosity of a 1% by wt. aqueous solution being above 300 cps.

EXAMPLE XI

Example II was repeated, however, the hemicellulose used was derived from oat hulls. The amount of epichlorohydrin used was increased by 0.2 ml., and pentaerythritol was replaced by glycerol. The final product had a viscosity of about 90 cps.

EXAMPLE XII

A partially degraded amylose (25 g.) as a 2% by wt. aqueous solution having a viscosity of 10 cps. was cross-linked under conditions as described under Example VII. An amount of about 1.7 ml. of epichlorohydrin was required for a substantial viscosity increase. Instead of sorbitol ethylene glycol was used for interrupting the cross-linking reaction and for incorporating with the final product. The viscosity of a 1% by wt. aqueous solution was about 95 cps.

The modified polysaccharides of the present invention are novel and useful products. For example, they may be used as thickening agents, suspending agents, emulsion stabilizers, and the like. One application, among many others, is the use in French dressings. This is demonstrated by thoroughly mixing the following ingredients:

| | |
|---|---|
| Powdered modified polysaccharide* | 0.6 |
| Sugar | 15.0 |
| Vinegar (100 grain) | 15.0 |
| Salt | 3.5 |
| Corn oil | 40.0 |
| Tomato paste | 15.0 |
| Other seasonings and flavorings | 1.1 |
| Water | 12.8 |

* Prepared according to Example V.

The resulting French dressing has an excellent mouthfeel and a long shelf life. Without containing the modified polysaccharide compound, the dressing separates within a short period of time.

While the invention has been described with the aid of examples under specific conditions, using specific ingredients, and the like, it will be appreciated that many variations can be made all being within the scope of the present invention as described by the following claims.

I claim:

1. In a method of stabilizing the aqueous solution of ether cross-linked polysaccharide molecules at a selected 1% aqueous solution viscosity value between 10 to 1500 cps. (Brookfield, 25° C.) where the said cross-linked polysaccharide molecules are formed by cross-linking a polysaccharide selected from the group consisting of an extract of barley husks, barley malt husks, oat hulls, corn cobs and wheat bran with a bifunctional etherifying reagent selected from the group consisting of epichlorohydrin, alkyl substituted epichlorohydrin, and glycerol dihalohydrin which provides reactive terminal epoxy groups on the cross-linked polysaccharide molecules, the improvement comprising; adding a water soluble hydroxy compound having a primary hydroxyl group selected from the group consisting of ethylene glycol, glycerol, dextrose, corn syrup, mannitol, sorbitol, and pentaerythritol to an aqueous alkaline solution of said cross-linked polysaccharide molecules at a reaction temperature below about 90° C.–100° C. at which temperature said hydroxy group is reactive with the said terminal epoxy group to form a stable terminal glycidyl ether group, said hydroxy compound having a molecular weight below that of said polysaccharide and being substantially non-volatile at a temperature below about 90° C.–100° C., and said hydroxy compound being added to said aqueous alkaline solution of said cross-linked polysaccharide molecules in an amount sufficient to react with all reactive epoxy groups in said solution; whereby further cross-linking of said polysaccharide molecules is terminated and said aqueous solution viscosity remains stabilized substantially at said selected value.

2. A method as in Claim 1, wherein said polysaccharide molecules are vegetable hemicellulose.

3. A process according to Claim 2, wherein said hydroxy compound comprises between about 5% and 30% of the weight of said polysaccharide.

4. A process as in Claim 1, wherein said reaction is allowed to continue at a reaction temperature of between about 90° C. and 100° C. after the addition of said hydroxy compound to said solution.

5. A method as in Claim 1, wherein said polysaccharide molecules are partially degraded amylose.

6. A method as in Claim 1, wherein said polysaccharide molecules are vegetable hemicellulose, said bi-functional reagent is epichlorohydrin, and said hydroxy compound is ethylene glycol.

7. A method as in Claim 1, wherein said alkaline reaction solution is neutralized and said cross-linked polysaccharide molecules having terminal glycidyl ether groups are recovered free of the neutralized reaction solution.

8. A process as in Claim 7, wherein the said ether cross-linked polysaccharide molecules containing the said terminal glycidyl ether groups are intimately contacted with at least 1% by weight of said hydroxy compound after neutralization and thereafter dried.

9. A process as in Claim 8, wherein said hydroxy compound is used for intimately contacting the stabilized ether cross-linked polysaccharide molecules in an amount between about 1% and 10% by weight of said cross-linked polysaccaride molecules.

10. An ether cross-linked polysaccharide compound consisting of a polysaccharide molecules cross-linked with a bifunctional etherifying reagent having a 1% aqueous solution viscosity between 10 and 1500 cps. (Brookfield, at 25° (C.) and containing a terminal glycidyl ether group which has the general formula:

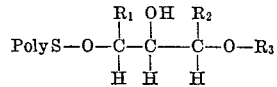

wherein polyS represents a plurality of ether cross-linked polysaccharide molecules in which the polysaccharide is selected from the group consisting of an extract of barley husks, barley malt husks, oat hulls, corn hulls, corn cobs and wheat bran and said polysaccharide molecules are cross-linked with a bi-functional etherifying compound selected from the group consisting of epichlorohydrin, alkyl substituted epichlorohydrin, and glycerol dihalohydrin which is adapted to form at least one reactive terminal epoxy group on the said cross-linked polysaccharide molecules, $R_1$ and $R_2$ are selected from the group consisting of hydrogen and alkyl having up to 15 carbon atoms, and $R_3$ is a glycidyl ether group consisting of a water soluble hydroxy compound which has a primary hydroxy group thereof removed by reacting with said terminal epoxy group, said hydroxy compound having a molecular weight below that of said polysaccharide molecules and being substantially non-volatile at a temperature below about 90° C.–100° C. and wherein said hydroxy compound is selected from the group consisting of ethylene glycol, glycerol, dextrose, corn syrup, mannitol, sorbitol, and pentaerythritol; and wherein C is carbon, H is hydrogen, and O is oxygen.

11. A stabilized polysaccharide compound as in Claim 10, wherein said bi-functional etherifying compound is selected from the group consisting of epichlorohydrin, alkyl substituted epichlorohydrin, glycerol dihalohydrin, and bis-(2 chloro ethyl) ether, and $R_3$ is a residue of a hydroxy compound selected from the group consisting of ethylene glycol, pentaerythritol, glycerol, dextrose, corn syrup, mannitol, sorbitol, and polysaccharide hydrolysates, which is substantially non-volatile below about 90°–100° C.

References Cited

UNITED STATES PATENTS

| | | | |
|---|---|---|---|
| 2,407,001 | 9/1946 | Griffin | 260—209 R |
| 2,496,670 | 2/1950 | Moe | 260—209 R |
| 2,523,708 | 9/1950 | Moe | 260—209 R |
| 2,650,917 | 9/1953 | Moe | 260—209 R |
| 3,208,994 | 9/1965 | Flodin | 260—209 R |
| 3,255,126 | 6/1966 | Fuzesi et al. | 260—209 R |
| 3,275,576 | 9/1966 | Flodin et al. | 260—209 R |
| 3,277,025 | 10/1966 | Flodin et al. | 260—209 R |
| 3,277,076 | 10/1966 | Yotsuzuka | 260—209 R |
| 3,300,474 | 1/1967 | Flodin et al. | 260—209 R |
| 3,542,759 | 11/1970 | Gelotte et al. | 260—209 R |

JOHNNIE R. BROWN, Primary Examiner

U. S. Cl. X.R.

99—144; 252—316, 352

PO-1050
(5/69)

UNITED STATES PATENT OFFICE
CERTIFICATE OF CORRECTION

Patent No. 3,829,412      Dated August 13, 1974

Inventor(s) Frederick L. G. Kunz

It is certified that error appears in the above-identified patent and that said Letters Patent are hereby corrected as shown below:

Col. 1, line 5, "Lunz" should read --Kunz--.
Col. 2, line 67, "agent" should read --reagent--.
Col. 6, line 22, "erylthritol" should read --erythritol--.
Col. 8, line 17, insert a coma (,) after "tol".
Col. 8, line 49, Claim 1, "to" should read --and--.
Col. 8, line 65, Claim 1, "hydroxy" should read --hydroxyl--.

Signed and sealed this 12th day of November 1974.

(SEAL)
Attest:

McCOY M. GIBSON JR.
Attesting Officer

C. MARSHALL DANN
Commissioner of Patents